Figure 1:
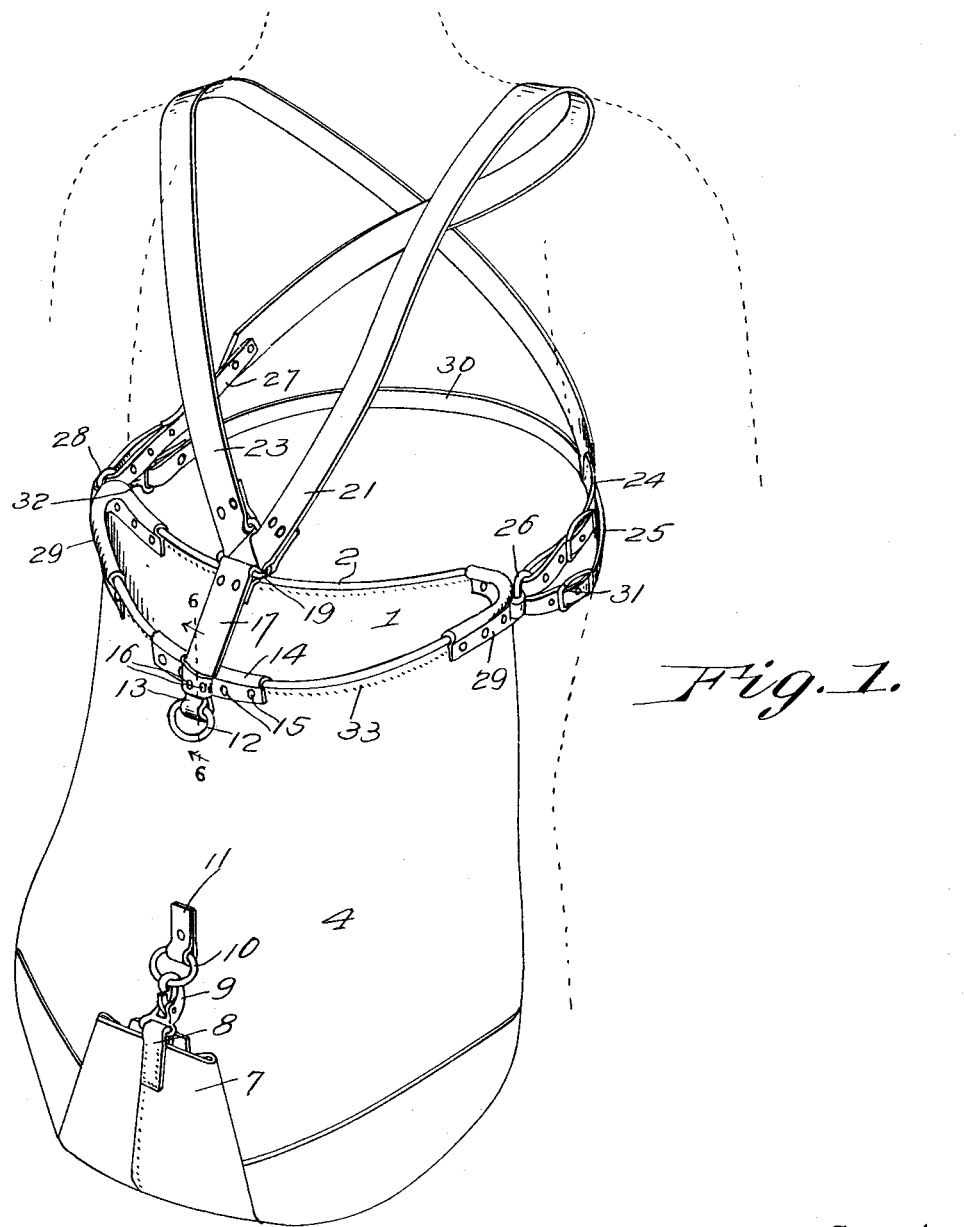

C. A. CARPENTER.
FRUIT GATHERING BAG.
APPLICATION FILED DEC. 3, 1914.

1,137,303.

Patented Apr. 27, 1915.
2 SHEETS—SHEET 1.

Witnesses

Inventor
C. A. Carpenter,
By E. H. Bond
Attorney

C. A. CARPENTER.
FRUIT GATHERING BAG.
APPLICATION FILED DEC. 3, 1914.
1,137,303.
Patented Apr. 27, 1915.
2 SHEETS—SHEET 2.
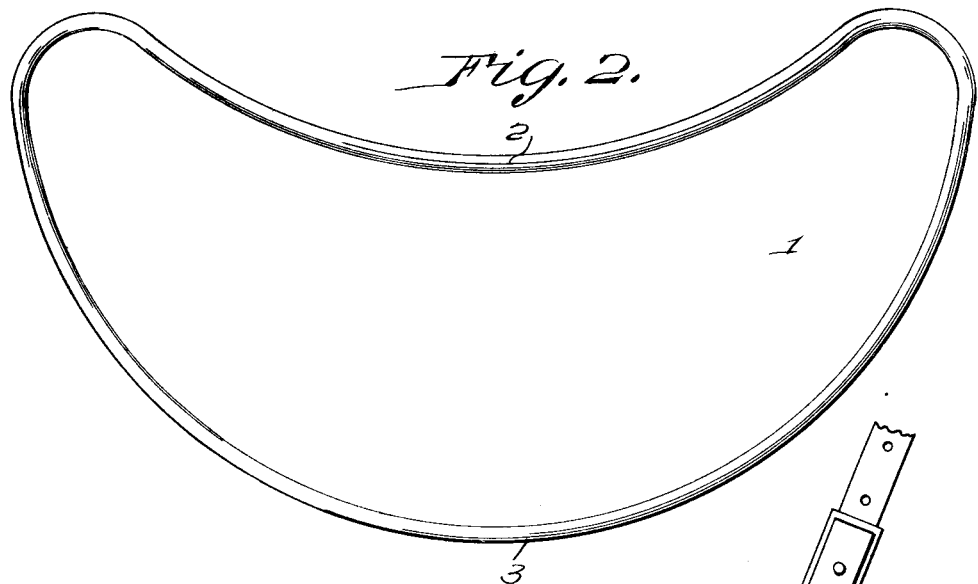
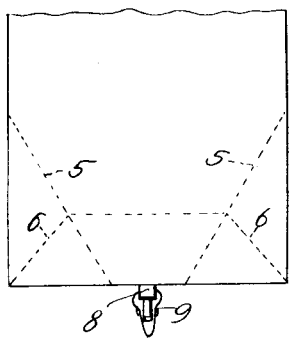
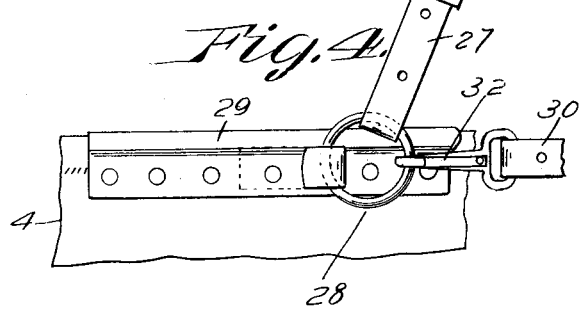
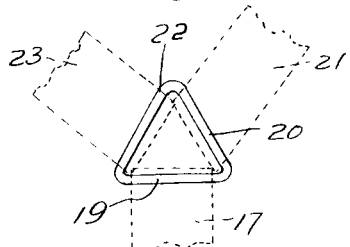
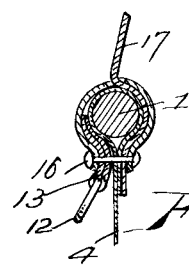
Witnesses
Ed. B. Brown.
R. R. Bond.
Inventor
C. A. Carpenter,
By E. H. Bond
Attorney

UNITED STATES PATENT OFFICE.

CHARLIE A. CARPENTER, OF WENATCHEE, WASHINGTON.

FRUIT-GATHERING BAG.

1,137,303. Specification of Letters Patent. Patented Apr. 27, 1915.

Application filed December 3, 1914. Serial No. 875,258.

*To all whom it may concern:*

Be it known that I, CHARLIE A. CARPENTER, a citizen of the United States, residing at Wenatchee, in the county of Chelan and State of Washington, have invented certain new and useful Improvements in Fruit-Gathering Bags, of which the following is a specification.

This invention relates to certain new and useful improvements in fruit picking bags or receptacles of the class designed to be worn by the operator and having provision for ready opening of the bottom of the bag to permit of the discharge of the fruit or vegetables or other articles therefrom.

The present invention has for its objects among others to provide an improved bag or receptacle of this nature embodying a frame of novel shape which, from experience, I have found to be most efficient and practical, the convex sides thereof being adapted to hug closely to the body, helping to keep the bag from getting out of place while in use; the outer circle of the frame is of a size and shape to make it easy to put the fruit thereinto and allowing it to be put to the bottom without bruising and without inconvenience to the operator. Moreover, the shape is such that I reduce to a minimum the tendency of the bag to catch onto limbs, branches and ladders while picking the fruit.

It has for another object to so affix the straps to the frame that they shall be in such position as to reduce to a minimum the chances of the hands being hindered while placing fruit, vegetables or other articles into the bag. I so place the rings at the rear of the frame as to cause them to tend to balance the bag while in use. The rings at the front of the bag, one near the top and one nearer the bottom, are designed for use with a snap hook carried by the folding flap at the bottom of the bag so as to adapt the latter for use at its maximum or minimum capacity. This arrangement tends to make it easier for the wearer to operate the bag. The opening at the bottom of the bag is as large as the extreme transverse dimensions of the bag so as to make it easy for the operator to empty the bag and also allowing the fruit to be emptied from the bag without injury. The shoulder straps are so disposed and connected with the bag as to allow the easy insertion of the hands through the opening in the top of the bag and their disposition insures that the load be carried from the shoulder without touching or nearing the neck, thus reducing to a minimum the inconvenience and discomfort in carrying the load. The belt for holding the bag in position about the body allows the wearer to stoop while gathering fruit etc. from the ground; also while climbing ladders and working among the branches of the trees. Further it prevents the bag from tipping while in use.

Other objects and advantages of the invention will hereinafter appear and the novel features thereof will be particularly pointed out in the appended claims.

The invention is clearly illustrated in the accompanying drawings, which, with the numerals of reference marked thereon, form a part of this specification, and in which—

Figure 1 is a perspective view of my improved bag showing the manner of attaching and supporting the same from the body of the wearer. Fig. 2 is an enlarged plan view of the frame for supporting the bag at the mouth. Fig. 3 is a detail showing the lower end of the bag and the manner in which the same is folded. Fig. 4 is an enlarged detail in side elevation showing the manner of attaching the shoulder strap and belt. Fig. 5 is a detail in elevation showing the triangular member for supporting the straps at the front of the mouth of the bag. Fig. 6 is an enlarged section on the line 6—6 of Fig. 1, looking in the direction of the arrows.

Like numerals of reference indicate like parts throughout the several views.

Referring to the drawings, 1 designates a frame of any suitable material, preferably of metal of circular cross section having a concave side 2 adapted to fit closely to the body of the wearer, for comfort and assisting in keeping the bag from getting out of position while in use. The front side is convex, as seen at 3, the frame being of elongated form and the shape of the outer circle or portion 3 is such as to render it easy to put fruit into the bag and to the bottom thereof without bruising the fruit or inconvenience to the operator. Furthermore, this shape lessens the tendency of the bag to catch on limbs, branches and ladders while picking the fruit.

4 is the bag of any suitable material, such as duck, secured to the frame 1 at its upper end, its lower end being provided with an opening as large as the extreme transverse dimensions of the bag for the purpose of making it easy for the operator to empty the bag and to permit emptying the fruit without injury thereto. When in use, the bottom of the bag is folded upon the dotted lines 5 and 6, the flap 7 resulting therefrom being provided with a strap 8 to which is attached in any suitable manner a snap hook 9. On the front face of the bag at a point a greater or less distance from the bottom there is a ring 10 affixed in any suitable manner, as by a clip 11, for coöperation with the snap hook. When the bag is designed to be used to its utmost capacity, the snap hook 9 is engaged within the ring 10, as indicated in Fig. 1. When it is desired to use the bag of less capacity, the snap hook is engaged in a ring 12 carried by a suitable clip or the like 13 at the top of the bag, as seen in Fig. 1. This clip 13 is secured in position by means of the leather strip 14 which engages over the front member 3 of the frame and secured by rivets or the like 15, as shown. The rivets or the like 16 at the center of this leather member serve also to retain the clip 13 in place and also serve to secure in place the strap 17 shown also in Fig. 1. This strap 17 has its upper end connected with one arm of a triangular member 19, which member is clearly illustrated in Fig. 5. Another arm 20 of this triangular member has secured thereto one end of a strap 21, while to the other side 22 of said triangular member is secured an end of the strap 23. These straps are adapted to engage over the shoulders of the wearer, as indicated in Fig. 1. The other end of the strap 23 has affixed thereto a leather strap 24 provided with a buckle 25 and adjustably engaged with a ring 26 affixed to the frame of the bag. The strap 21 has attached thereto a similar strap 27 provided with a buckle and engaging a ring 28 secured to the opposite side of the frame, these rings being attached by means of leather members 29 similar to the leather member 14 above described.

30 is a belt for holding the bag in position close to the body, allowing the wearer to stoop while gathering fruit etc. from the ground as well as while climbing ladders and working among the branches of the trees. It also prevents the bag from tipping while in use. This belt has at one end a buckle 31 so that the same may be adjusted to the girth of the wearer, the other end being provided with a snap hook 32 for engagement with the ring 28, as seen in Figs. 1 and 4.

The upper end of the bag 4 may be passed around the frame 1, as seen in Fig. 6, and when embraced by the leather members hereinbefore described and the latter riveted in place, it constitutes an exceedingly strong means of attachment of the upper end of the bag and the other members. The upper end of the bag may be stitched, as shown at 33, for additional security.

From the foregoing, when taken in connection with the annexed drawings, it will be seen that I have devised a simple, yet efficient and durable, convenient form of bag for gathering fruit, vegetables, etc., and while the structural embodiment of the invention as hereinbefore disclosed is what I at the present time consider preferable, it is evident that the same is subject to changes, variations and modifications in detail, proportion of parts etc. without departing from the spirit of the invention or sacrificing any of its advantages. I, therefore, do not intend to restrict myself to the exact details of construction, proportion of parts etc. as hereinbefore set forth, but reserve the right to make such changes, variations and modifications as come properly within the scope of the protection prayed.

It is deemed important that the frame 1 be substantially rigid and that the shoulder straps be connected to the ends of said frame and to the front at substantially the mid center; also that the belt be connected to the ends of the frame and adjustable independently of the shoulder straps as it is found that such disposition of these parts distributes the strain due to the weight of the fruit so that the frame is not unduly distorted and the weight is borne in a great measure by the shoulders, assisted by the belt, yet the wearer has freedom of movement of his body and limbs in picking the fruit and discharging the same from the bag.

What is claimed as new is:—

1. A bag of the character stated, comprising a substantially rigid elongated frame having convex and concave sides, a bag proper secured thereto, means for holding the bottom of the bag in closed condition, a clip secured to the front of said frame, a ring in said clip, a strap extending upwardly from said clip, a triangular member secured to the upper end of said strap, and shoulder straps each having one end secured to said triangular member and extending in opposite directions, said shoulder straps being crossed and having their other ends secured to the opposite ends of said frame.

2. A bag of the character stated, comprising a substantially rigid elongated frame having convex and concave sides, a bag proper secured thereto, means embracing the frame at the ends and at the front, rings carried by said means at the ends of the frame, shoulder straps having one end adjustably connected to said rings, a belt having its ends adjustably connected to said rings, and means connecting the other ends of said shoulder straps to the means at the front of the frame.

In testimony whereof I affix my signature in presence of two witnesses.

CHARLIE A. CARPENTER.

Witnesses:
L. J. JONES,
S. M. SNYDER.

Copies of this patent may be obtained for five cents each, by addressing the "Commissioner of Patents, Washington, D. C."